(12) United States Patent
Glass et al.

(10) Patent No.: US 8,385,511 B2
(45) Date of Patent: Feb. 26, 2013

(54) DIAL CAPTURE ALARM INTERFACE WITH INTEGRATED VOICE

(75) Inventors: Heath Glass, Duluth, GA (US); Christopher Bear, Marietta, GA (US)

(73) Assignee: Telular Corporation, Chicago, IL (US)

(*) Notice: Subject to any disclaimer, the term of this patent is extended or adjusted under 35 U.S.C. 154(b) by 139 days.

(21) Appl. No.: 13/031,332

(22) Filed: Feb. 21, 2011

(65) Prior Publication Data
US 2012/0121073 A1    May 17, 2012

Related U.S. Application Data

(60) Provisional application No. 61/413,710, filed on Nov. 15, 2010.

(51) Int. Cl.
*H04M 11/00* (2006.01)
(52) U.S. Cl. ............ 379/39; 379/37; 379/45; 455/404.1
(58) Field of Classification Search .............. 379/37–45; 340/5.2, 10.2, 3.1, 539.22, 572.1, 7.6; 455/404.1
See application file for complete search history.

(56) References Cited

U.S. PATENT DOCUMENTS

| | | | |
|---|---|---|---|
| 4,993,059 A | 2/1991 | Smith et al. | |
| 5,185,779 A | 2/1993 | Dop et al. | |
| 5,568,535 A * | 10/1996 | Sheffer et al. | 379/39 |
| 5,675,626 A | 10/1997 | Davis | |
| 6,049,273 A | 4/2000 | Hess | |
| 6,825,762 B2 | 11/2004 | Giacopelli et al. | |
| 7,053,768 B2 | 5/2006 | Seshadri | |
| 7,085,551 B1 | 8/2006 | Bonner et al. | |
| 7,130,609 B2 | 10/2006 | Cardina | |
| 7,508,754 B1 | 3/2009 | Sankaranaraynan et al. | |
| 7,542,721 B1 | 6/2009 | Bonner et al. | |
| 2004/0041910 A1 | 3/2004 | Naidoo et al. | |
| 2008/0169922 A1 | 7/2008 | Issokson | |
| 2008/0311879 A1 * | 12/2008 | Martin et al. | 455/404.1 |
| 2009/0017751 A1 | 1/2009 | Blum | |
| 2009/0323904 A1 | 12/2009 | Shapiro | |
| 2010/0277585 A1 * | 11/2010 | Dasai et al. | 348/143 |

* cited by examiner

*Primary Examiner* — Melur Ramakrishnaiah
(74) *Attorney, Agent, or Firm* — Adam K. Sacharoff

(57) ABSTRACT

In one aspect of the present invention there is provided a system that provides for one or more of the following: (a) allows a dial capture alarm communicator to both send event data and provide a voice path to an alarm receiver at the central station; (b) is not integrated into the alarm panel, which allows it to be added to almost any preexisting installation; (c) uses industry-standard event reporting protocols, it can be used with any alarm panel that provides industry-standard event notifications; and/or (d) provides transparent transport for both the voice and the data, meaning that neither the alarm panel nor the alarm communicator at the central station is aware of the communicator's intermediary function.

4 Claims, 10 Drawing Sheets

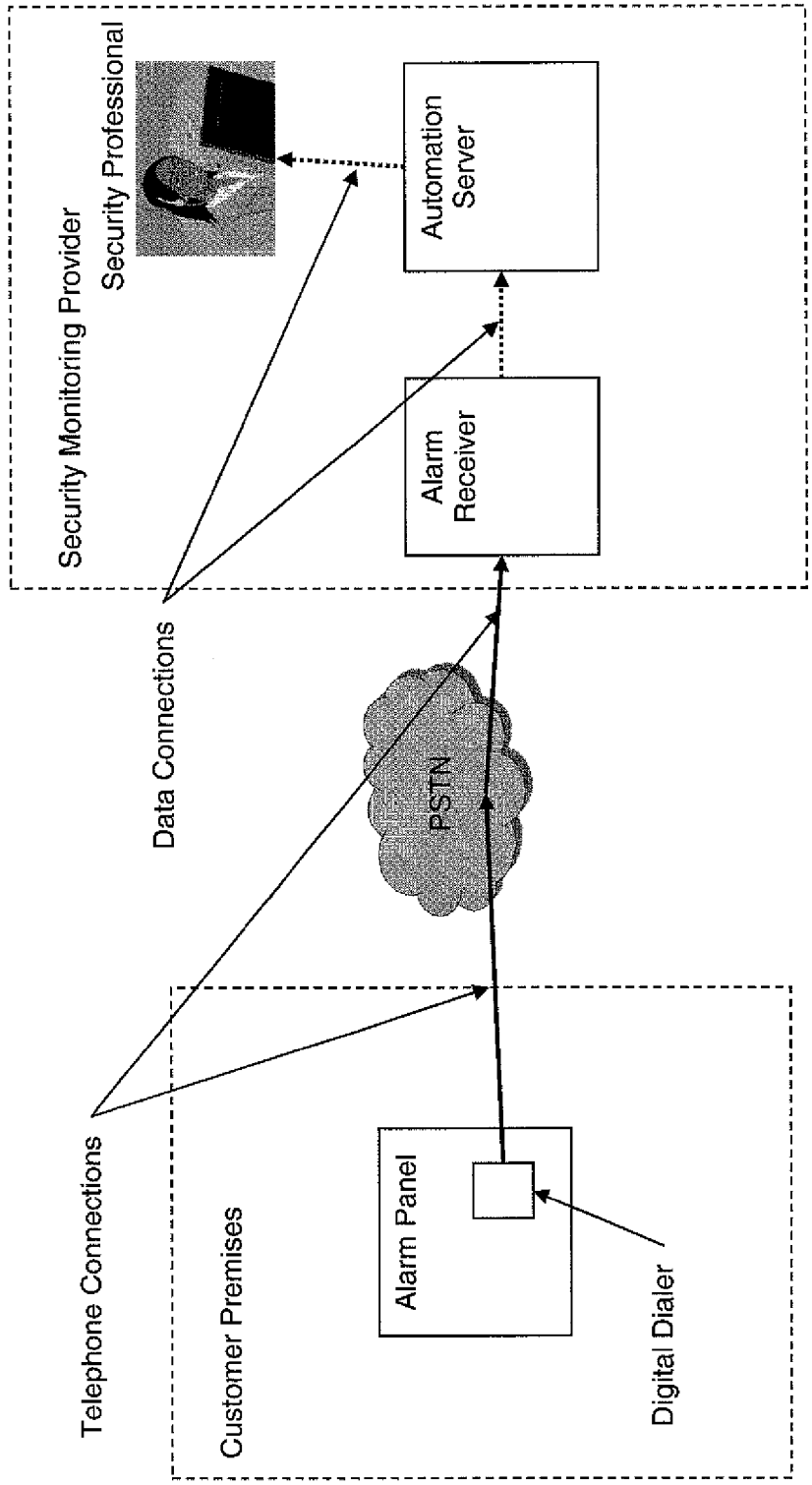
Figure 7 Prior Art Traditional Alarm Reporting

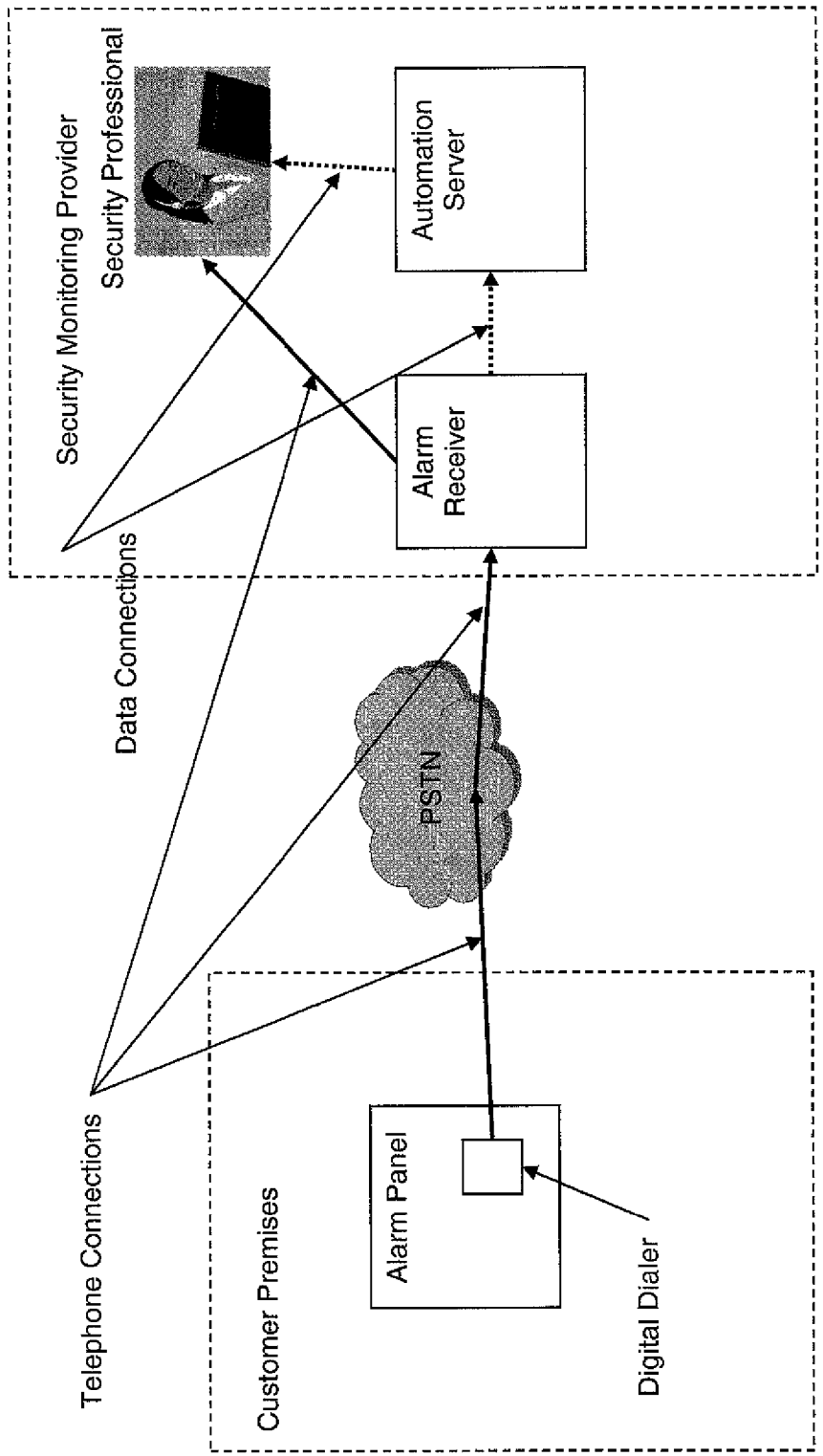
Figure 8 Prior Art Traditional Alarm Reporting with Voice

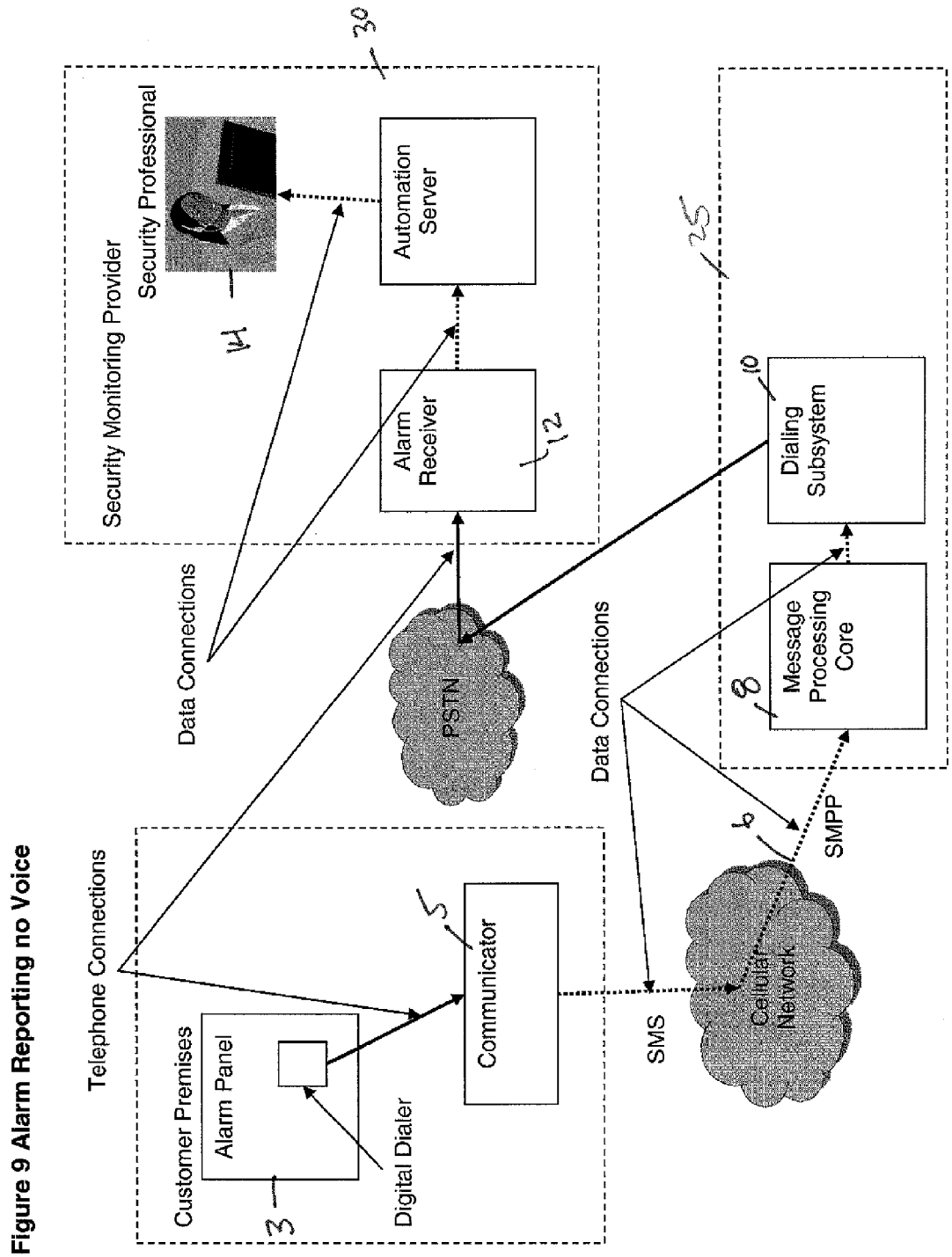
Figure 9 Alarm Reporting no Voice

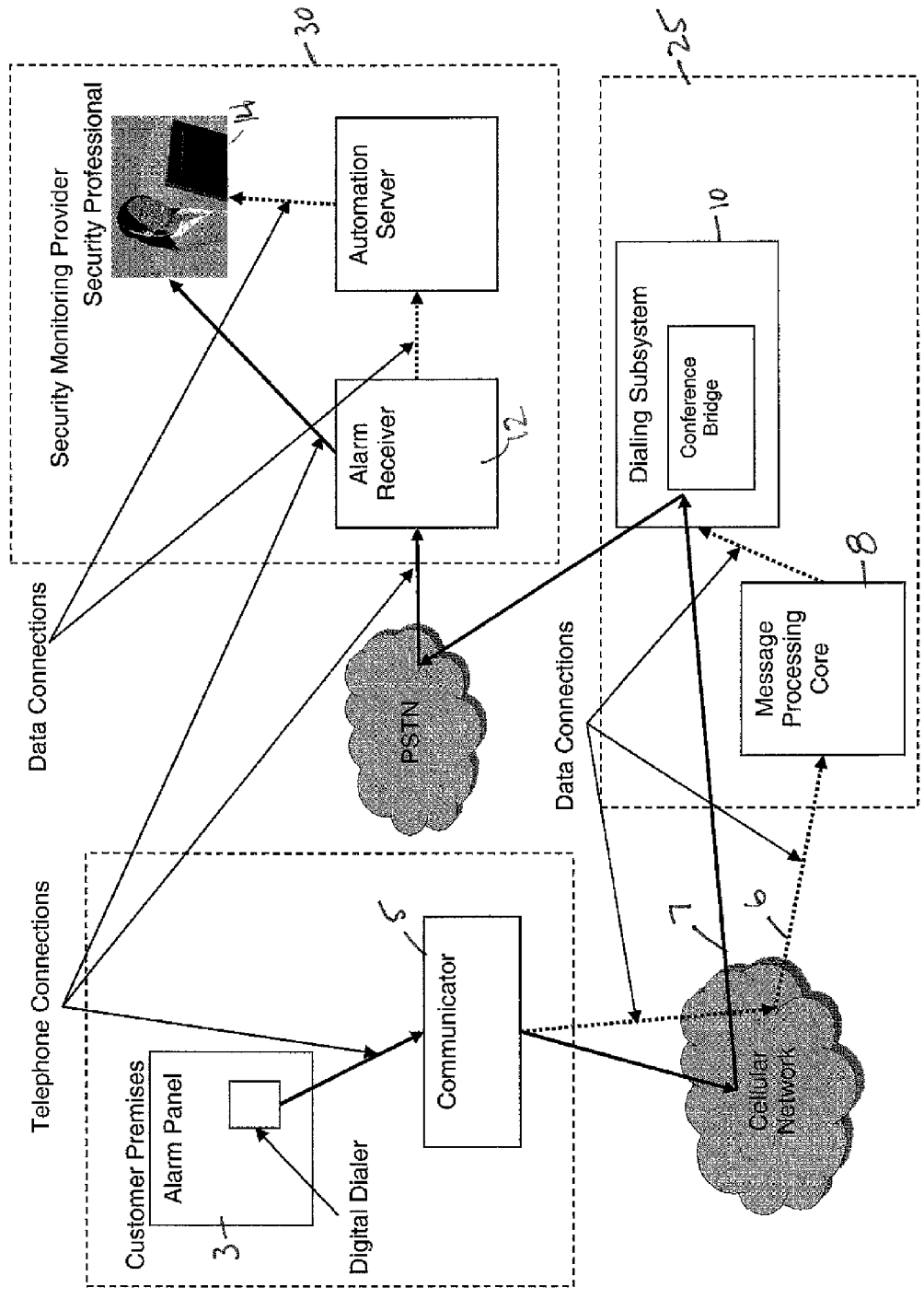
Figure 10 Alarm Reporting with Voice

DIAL CAPTURE ALARM INTERFACE WITH INTEGRATED VOICE

CROSS REFERENCE OF THE INVENTION

The present invention claims priority to U.S. Provisional Patent Application No. 61/413,710 filed Nov. 15, 2010.

FIELD OF THE INVENTION

The present invention relates generally to the field of security systems, and in particular to a system and method for interfacing a dial capture alarm communicators with integrated voice communications.

BACKGROUND OF THE INVENTION

In residential and commercial alarm systems typically report events (including alarms) use a land-line phone connection to the central station. In traditional installations, the event data is sent through a combination of tones and data over the phone line to a DACR (digital alarm communication receiver) located at the central station. Recently, alarm panels have begun to provide voice communication capabilities, whereby at the end of the event transmission, the alarm panel signals the DACR that it will not disconnect, and the DACR should connect the incoming telephony path to an attendant. At this point, the attendant, via DTMF commands, can establish a one-way or two-way voice path with the alarm panel. This feature has proven to be very useful for alarm verification, as well as for use in PERS (Personal Emergency Response System) installations. However, it does present difficulties for dial capture cellular alarm communicators.

Dial capture cellular alarm communicators allow an alarm panel to communicate with a central station in locations where no telephone connection is present, or where a backup to the existing telephone line is desired or required. Dial capture communicators typically function by "capturing" the tones and data sent by the alarm panel, converting these events to cellular data, and transmitting them to an alarm communication center. The alarm communication center then converts the data it has received from the communicator to tones and data on a telephone connection to the alarm receiver. Because of this conversion process, dial capture communicators are currently unable to provide a path for the voice communication.

SUMMARY OF THE INVENTION

It is therefore an aspect of the present invention to improve upon the prior art by providing a system and/or method that provides for one or more of the following: (a) allows a dial capture alarm communicator to both send event data and provide a voice path to an alarm receiver at the central station; (b) is not integrated into the alarm panel, which allows it to be added to almost any preexisting installation; (c) uses industry-standard event reporting protocols, so that it can be used with any alarm panel that provides industry-standard event notifications; and/or (d) provides transparent transport for both the voice and the data, meaning that neither the alarm panel nor the alarm communicator at the central station is aware of the communicator's intermediary function.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

A fuller understanding of the foregoing may be had by reference to the accompanying drawings, wherein:

FIGS. 7 and 8 are prior art traditional alarm reporting systems; and

FIGS. 9 and 10 are systems according to one or more embodiments of the present invention providing for both without voice and with voice.

DETAILED DESCRIPTION OF THE EMBODIMENTS

Figure 1:
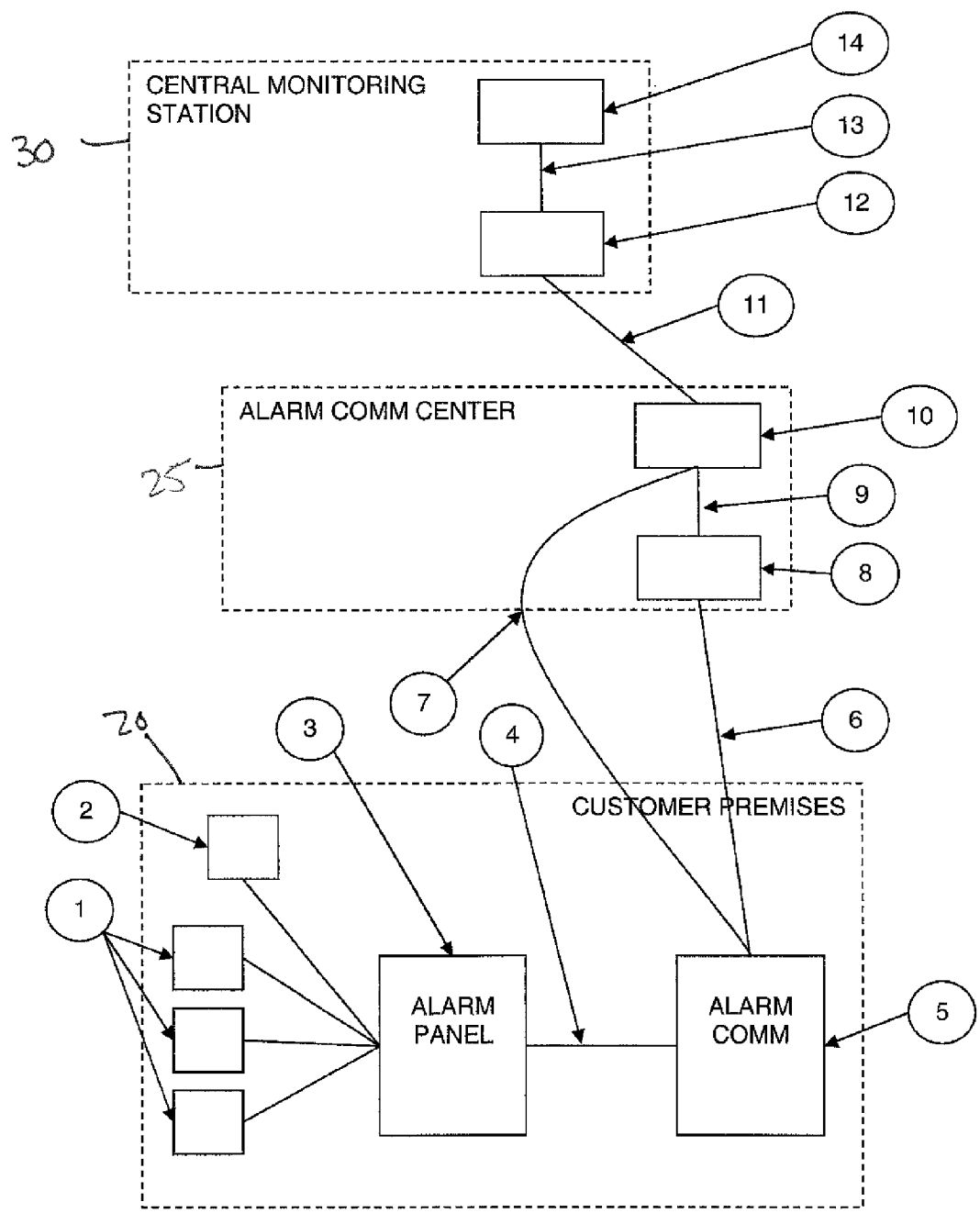
FIG. 1 is a schematic of a system in accordance with an embodiment of the present invention that allows a dial capture alarm communicator to both send event data and provide a voice path to an alarm receiver at the central station.

While the invention is susceptible to embodiments in many different forms, there are shown in the drawings and will described herein, in detail, the preferred embodiments of the present invention. It should be understood, however, that the present disclosure is to be considered an exemplification of the principles of the invention and is not intended to limit the spirit or scope of the invention and the embodiments illustrated.

FIG. 1 illustrates an overview of a system in accordance with an embodiment of the present invention that allows a dial capture alarm communicator to both send event data and provide a voice path to an alarm receiver at the central station. The system includes a customer premises 20, an alarm communication center 25 and a central monitoring station 30. The customer premises 20 includes one or more security sensors 1 and an audio station 2. The sensors 1, detect intrusion, movement, fire, and other events and will send notifications to the alarm panel. Sensors may be connected to the alarm panel through either wired or wireless connections. The audio station 2 provides a speaker and microphone for processing audio. The audio station 2 is used for audio communication between the central monitoring station and the customer premises, and typically allows both 2-way voice communication and 1-way listen-in capability. The audio station 2 may be stand-alone, or may be integrated into either an alarm panel 3 or an alarm keypad connected to the alarm panel 3.

The alarm panel 3 includes an alarm communicator reporting interface 4 used to report events to the alarm communicator 5. For alarm panels providing listen-in or 2-way voice capability, this is a dial capture (telephone) connection. It reports events in a particular format, e.g. Contact ID, which contains information about the event, as well as where and when it occurred. If the alarm panel 3 is programmed to deliver an audio channel, then the alarm panel 3 will maintain the audio path on this telephony connection after the alarm signals have been delivered to the alarm communicator 5. The alarm communicator 5 provides a communication path between the alarm panel 3 and the alarm communication center 25 for reporting events. If the alarm communicator 5 detects that the alarm panel 3 is trying to establish a voice path, it will establish a voice path 7 between the alarm panel 3 and the alarm communication center 25 dialing subsystem 10.

The alarm communicator connects to the alarm communication center 25 with both a long-range data interface 6 and a long-range voice interface 7. The long-range data interface 6 connects the alarm communicator 5 to the alarm communication processing subsystem 8. It reports events detected by the alarm panel. It can be a wired or wireless interface, and may be one or more of cellular SMS, cellular IP, Ethernet, WiFi, or similar interfaces. The long-range voice interface 7 connects the alarm communicator to the dialing subsystem 10 of the alarm communication center. It is usually a cellular voice call, although it may also be voice encoded as data over an IP network, i.e. VoIP.

The alarm communication processing subsystem 8 receives events from the alarm communicator 5, and the alarm panel to which it is connected. When an event report is received from the alarm communicator, it instructs the dialing subsystem to make a call to the central monitoring station 30, and report the alarm in the original format that was used by the alarm panel 3 to report the alarm to the alarm communicator 5. The alarm communication processing subsystem 8 uses an interface 9 to instruct the dialing subsystem 10 to make a call to the central monitoring station 30. If the event data received from the alarm communicator 5 contains an indication that this is an audio-enabled event report, then the instructions to the dialing subsystem 10 contain this indication, as well as sufficient data to correlate the dialing instructions with an incoming call 7 arriving at the dialing subsystem 10 from the alarm communicator 5. The Dialing Subsystem 10 translates the event signaling data from the alarm communicator 5 into the original format that was used by the alarm panel 3 to report the alarm to the alarm communicator 5. If the alarm panel 3 delivered an audio connection with the event report, the Dialing Subsystem 10 also receives a voice connection 7 from the Alarm Communicator 5. The voice connection from the alarm communicator 5 is connected to the outbound dialed call to the central monitoring station 30 after the event data is delivered.

An alarm communication center/alarm receiver interface 11 is a circuit-switched connection that delivers tones and data containing event information, and, in the case of a listen-in event, also provides an audio path between an alarm receiver 12 and the alarm communication center 25, and, eventually, back to the originating alarm panel 3 through the voice connection 7. The connection is usually made through the Public Switched Telephone Network (PSTN), although it may also be made over private connections. There may also be private telephony equipment, such as a PBX, used at the central monitoring station to route the connection to the alarm receiver 12 as appropriate.

The alarm receiver 12 collects event reports that originated from the alarm panel 3, which is connected through the alarm communicator 5 and the alarm communication center 25. The events are typically processed by central monitoring station 30, and are routed to attendants as appropriate. If an audio connection is established with the alarm receiver 12 from the alarm communication center dialing subsystem 10, then it establishes a voice path with the attendant. In some cases, the alarm receiver 12 may transfer the audio connection to the attendant through telephony equipment, such as a PBX.

From the alarm receiver 12 a connection path 13 is established to the attendant station 14. The connection path 13 is usually in the form of a telephone call through a private telephony network. In some cases, the alarm receiver 12 will invoke a transfer at the PBX of the incoming call, in which case the alarm receiver 12 is no longer in the audio path. The attendant station 14 receives the voice call that originally terminated in the central monitoring station 30 at the alarm receiver 12. As the audio path is then established end-to-end with the alarm panel 3, the attendant is usually able to directly control the microphone and speaker functions at the alarm panel 3, typically through a series of DTMF tone commands.

Figure 2:
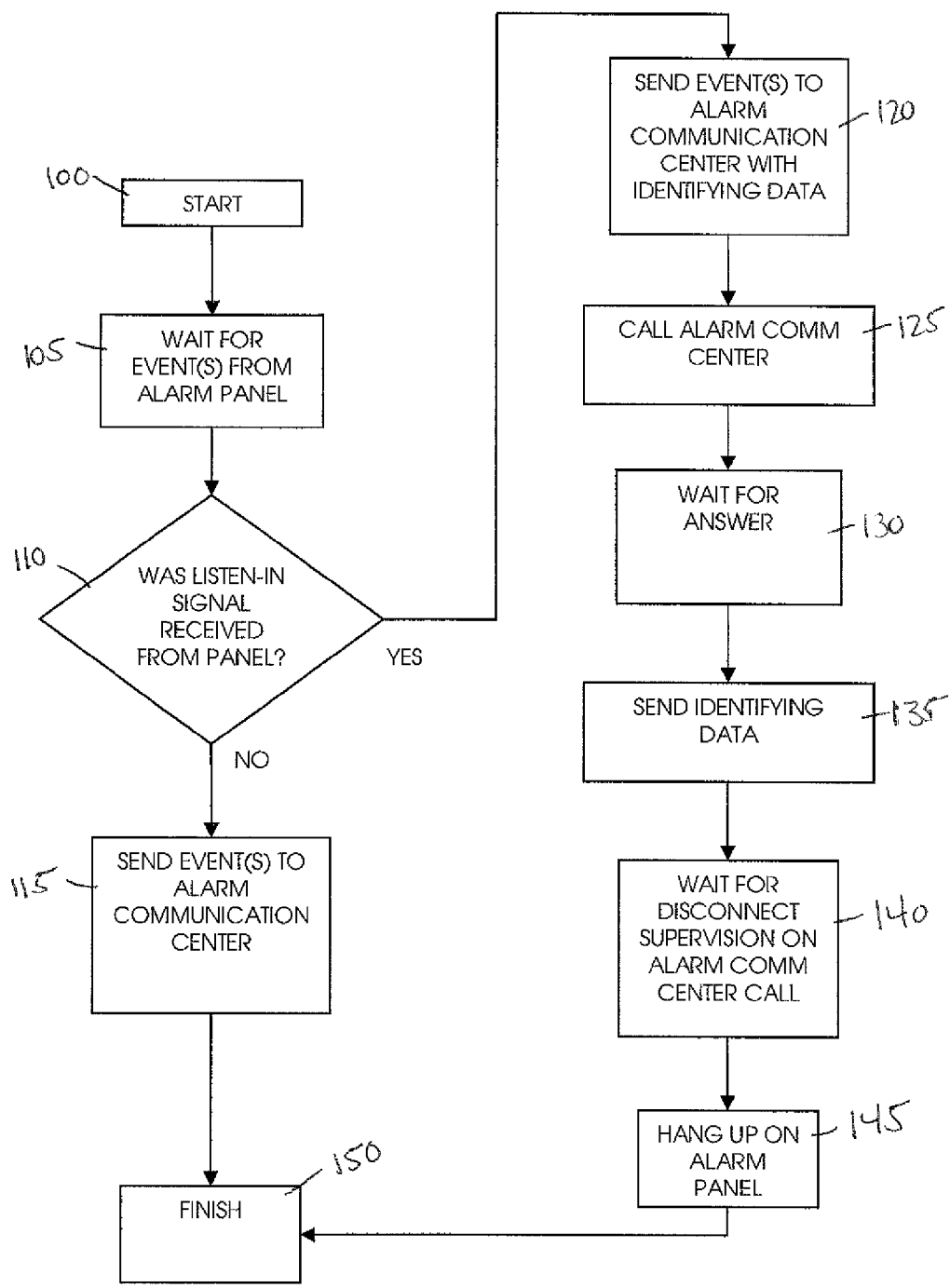
FIG. 2 is a method of the alarm communicator as it receives events in accordance with one embodiment of the present invention.

Referring now to FIG. 2, there is provided a method of the alarm communicator 5 as it receives events in accordance with one embodiment of the present invention. In box 100, the method begins by having the alarm communicator 5 on stand by to wait for an event, box 105. When an event is received the alarm communicator 5 will determine if the listen-in signal was also activated, box 110. If not the method proceeds by sending the event to the alarm communication center 25 for processing, box 115 and then the method ends 150. If the listen-in signal was received, the method would proceed to send the event to the alarm communication center with identifying data (defined in greater detail below), box 120. This is accomplished by having the alarm communicator 5 call the alarm communication center 25, box 125 and will wait for the alarm communication center 25 to answer, box 130. Once answered, the alarm communicator 5 will send the identifying data 135. The alarm communicator 5 will then wait for the alarm communication center 25 to disconnect the connection, box 140 and then the alarm communicator 5 will further hang up on the alarm panel 3.

Figure 3:
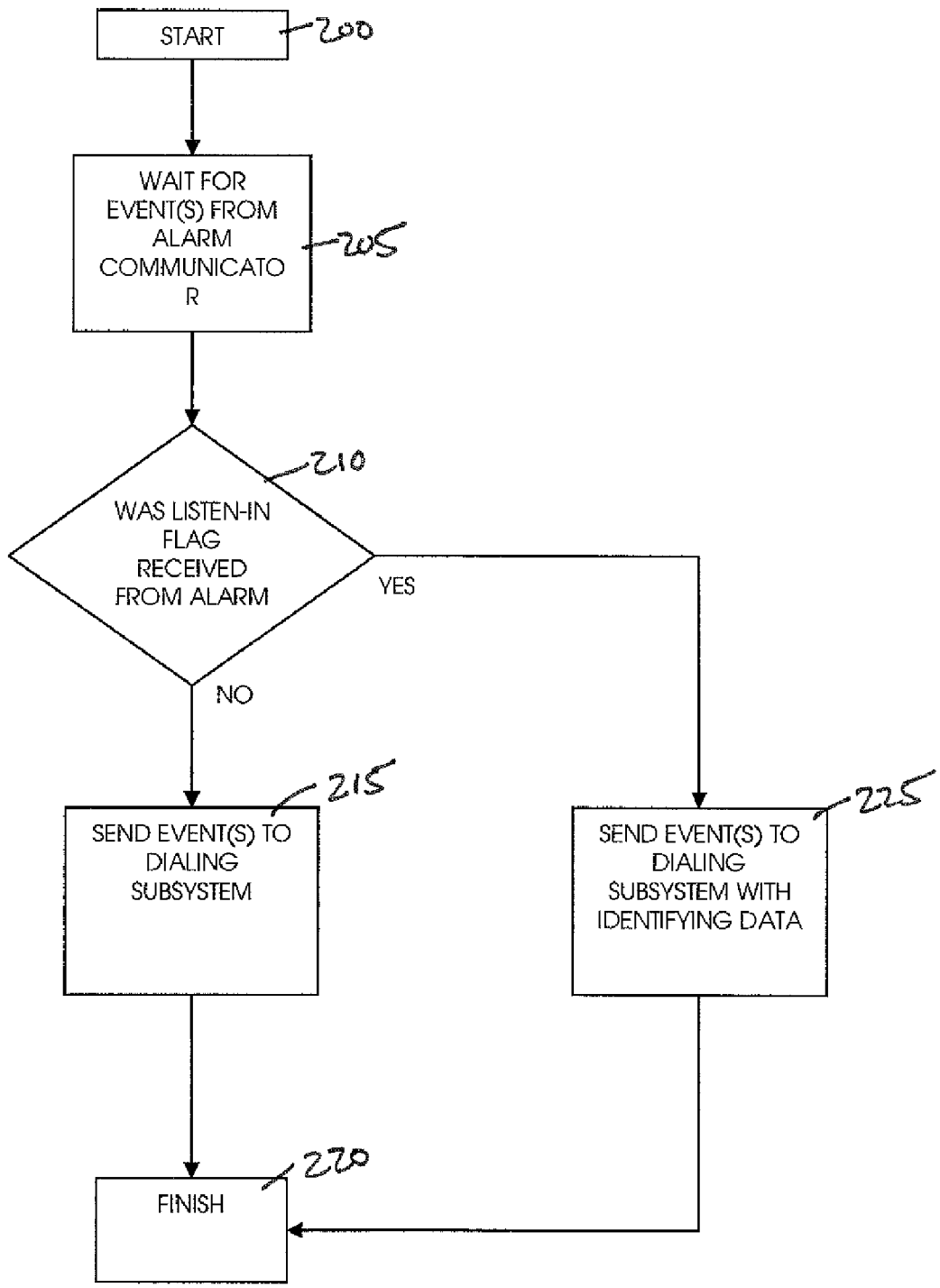
FIG. 3 is a method of the alarm processing subsystem as it receives events in accordance with one embodiment of the present invention.

Referring now to FIG. 3, there is provided a method of the alarm processing subsystem as it receives events in accordance with one embodiment of the present invention. As the method begins, box 200, the subsystem waits for an event to be sent from the alarm communicator 5, box 205. The subsystem will determine if a listen-in flag is received from the alarm panel 3, box 210. If not, the subsystem sends events to the dialing subsystem 10, box 215 and then ends, box 220. If a listen-in flag is received the subsystem sends the event to the dialing subsystem with identifying data, box 225 and then ends, box 220.

Figure 4:
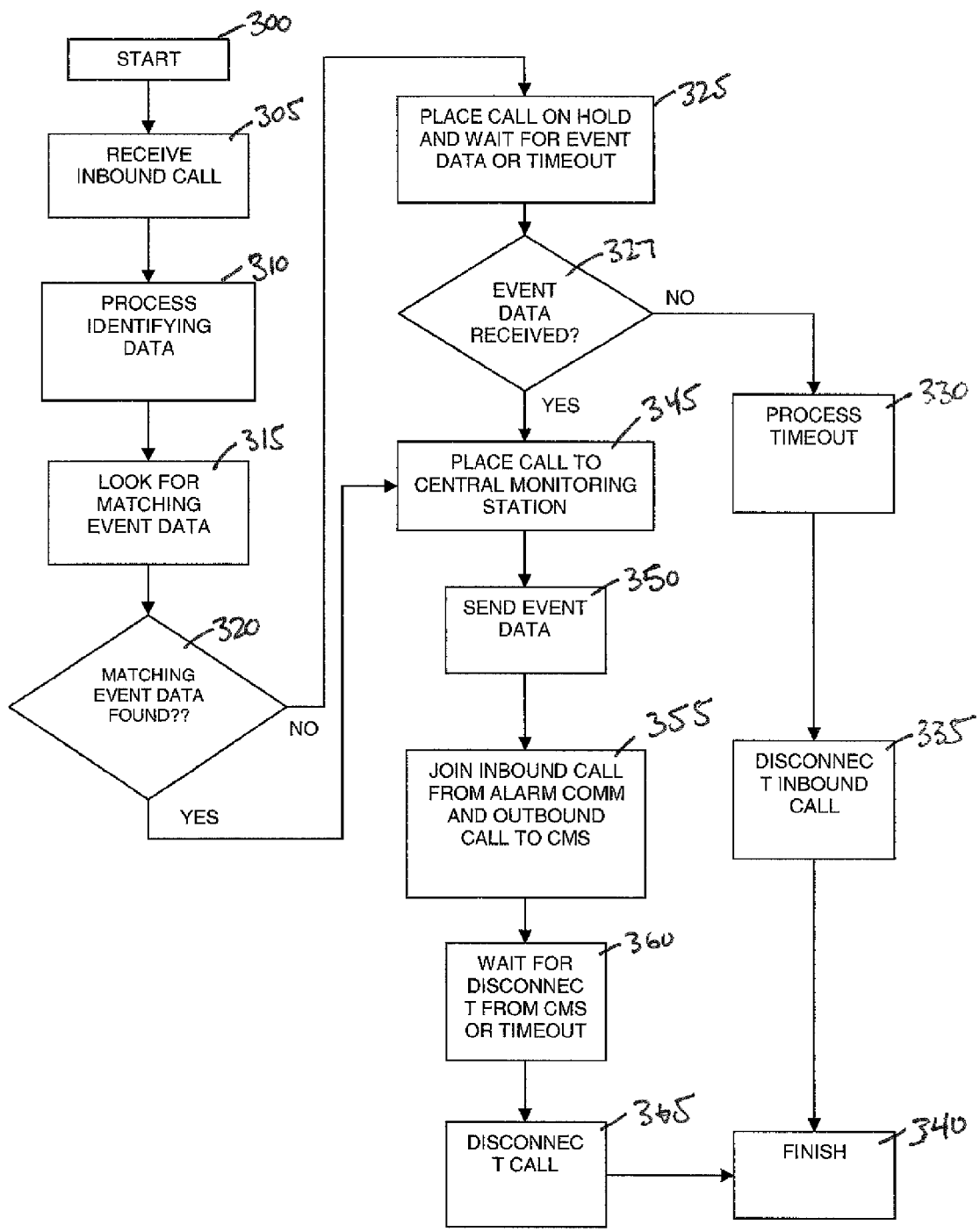
FIG. 4 is a method of the dialing subsystem as it receives an inbound call from the alarm communicator.

Referring now to FIG. 4, there is provided a method of the dialing subsystem as it receives an inbound call on the long range voice interface 7 from the alarm communicator 5. In box 300, the method begins by receiving an inbound call, box 305. The dialing subsystem will process the identifying data, box 310 and look for matching event data, box 315. Event data matches the incoming call if one of the following two conditions is true: the incoming caller ID on the call matches the MSISDN provided in the event data message, or the generated code provided in the event message matches a DTMF dialed code that is generated by the communicator when the inbound call is answered by the dialing subsystem. The subsystem will determine if a matching event data was found, box 320. If a matching event data is not found, the method proceeds to place the call on hold and wait for the event data or a timeout sequence, box 325. The dialing subsystem will wait to determine if the event data is received, box 327. If the event data is not received, the process times out, box 330, the subsystem is disconnect the call, box 335 and the method ends, box 340.

If the event data is received, the subsystem (from either box 320 or box 327) will place a call to the central monitoring station 30, box 345, and will send the event data, box 350. The dialing subsystem will join an inbound call from the alarm communicator and an outbound call to the central monitoring station, box 355. The subsystem will wait for a disconnection from the central monitoring station or a timeout, box 360 and then will disconnect the call, box 365.

Figure 5:
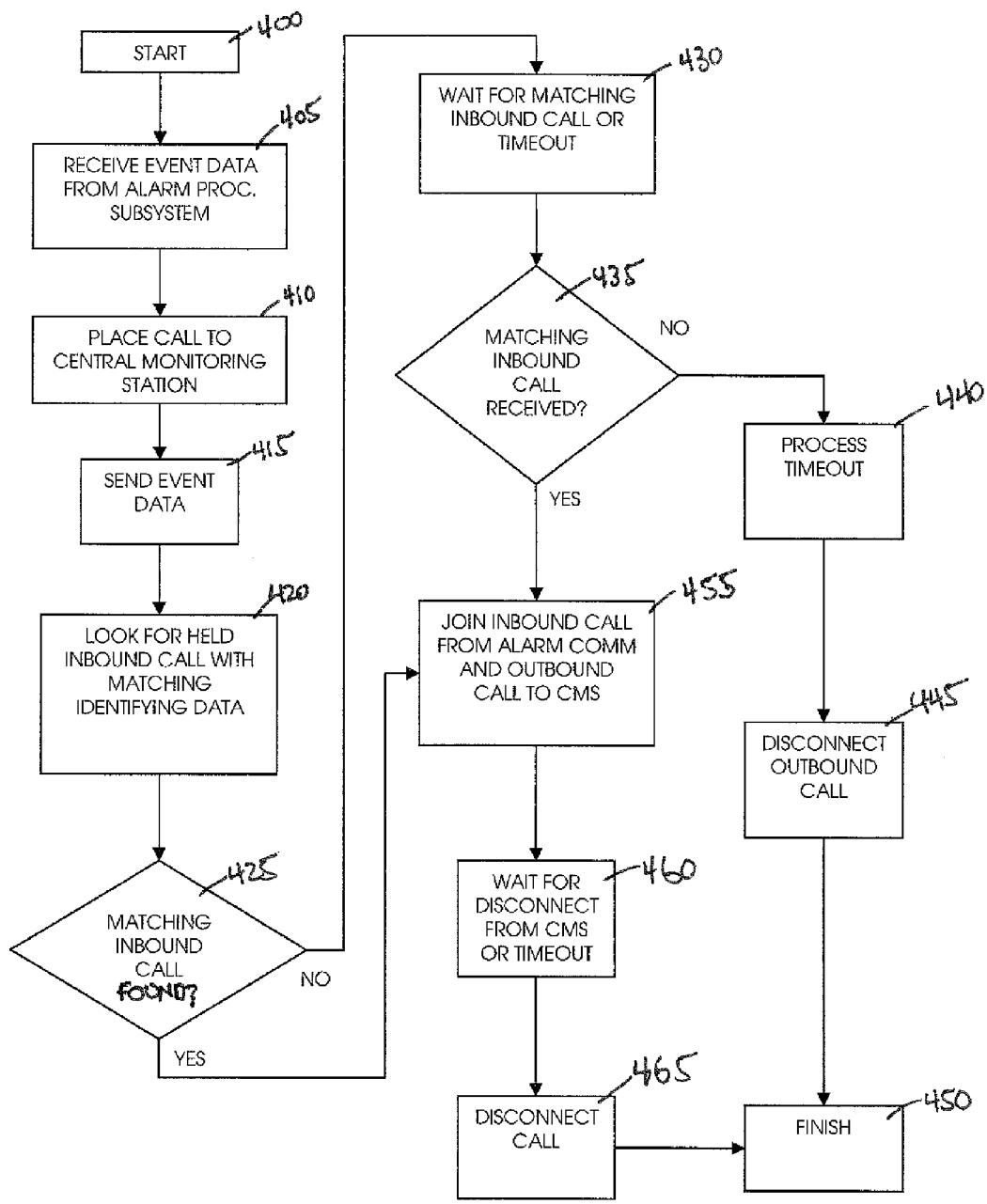
FIG. 5 is a method of the dialing subsystem as it receives and processes events.

Referring now to FIG. 5, there is provided a method of the dialing subsystem as it receives and processes events. As the method begins, box 400, the dialing subsystem receives event data from the alarm processing subsystem, box 405. The dialing subsystem will place a call to the central monitoring station, box 410 and send the event data, box 415. The dialing subsystem will look for a held inbound call with matching identifying data, box 420 and will determine if a matching inbound call was found, box 425. If a matching inbound call was not found, the dialing subsystem will wait for a matching inbound call or a timeout, box 430. The method will then determine if a matching inbound call is received, box 435. If not received, the method will timeout, box 440, disconnect the outbound call, box 445, and then end, box 450. If a matching inbound call was received, the method continues from box 435 or box 425 to joining the inbound call from the alarm communicator 5 and the outbound call to the central monitoring station, box 455. After joining the two the dialing subsystem will interface 11 with the central monitoring station 30 wait for a disconnect from the central monitoring station or timeout, box 460 and the disconnect the call, box 465.

One of the important elements for one or more of the embodiment provided herein is the merging of audio streams. A key component of this is the ability of the alarm communicator 5, in conjunction with the alarm communication center 25, to provide a path for both alarm signaling and audio connectivity between the alarm panel 3 and the central monitoring station 30, by effectively splitting the audio and data elements at the alarm communicator 5, and merging them again at the alarm communication center 25. This is done so that a reliable data path can be provided to alarm signaling, while still allowing audio signals to be passed.

In addition, the alarm communicator 5 uses a telephony dial capture interface to receive event notification from the alarm pane 31. Since the dial capture interface is a telephony interface, this also provides an audio path after the event transmission is completed.

Furthermore, in order to correlate event data received over a data path with the associated incoming voice call, the dialing subsystem uses one or more of several identifying data: (a) the caller ID of the inbound call, if available, is matched against the PSTN phone number or mobile number of the alarm communicator 5; (b) after the inbound call is answered, the alarm communicator 5 may transmit correlation digits as DTMF tones to the dialing subsystem 10; (c) after the inbound call is answered, the alarm communicator 5 may transmit correlation data as modem-modulated data to the dialing subsystem 10; (d) in the case of a VoIP-encoded audio stream, data tags associated with the VoIP call setup will be used to correlate the incoming call and the event data at the dialing subsystem 10.

In yet other aspects, in order to ensure orderly resource management in the case of a communication failure, several timers are used to ensure that incoming calls to the dialing subsystem 10 are not held indefinitely waiting for correlating event reports, and that events reports to the central monitoring station 25 are not delayed substantially waiting for correlating inbound calls.

Figure 6:
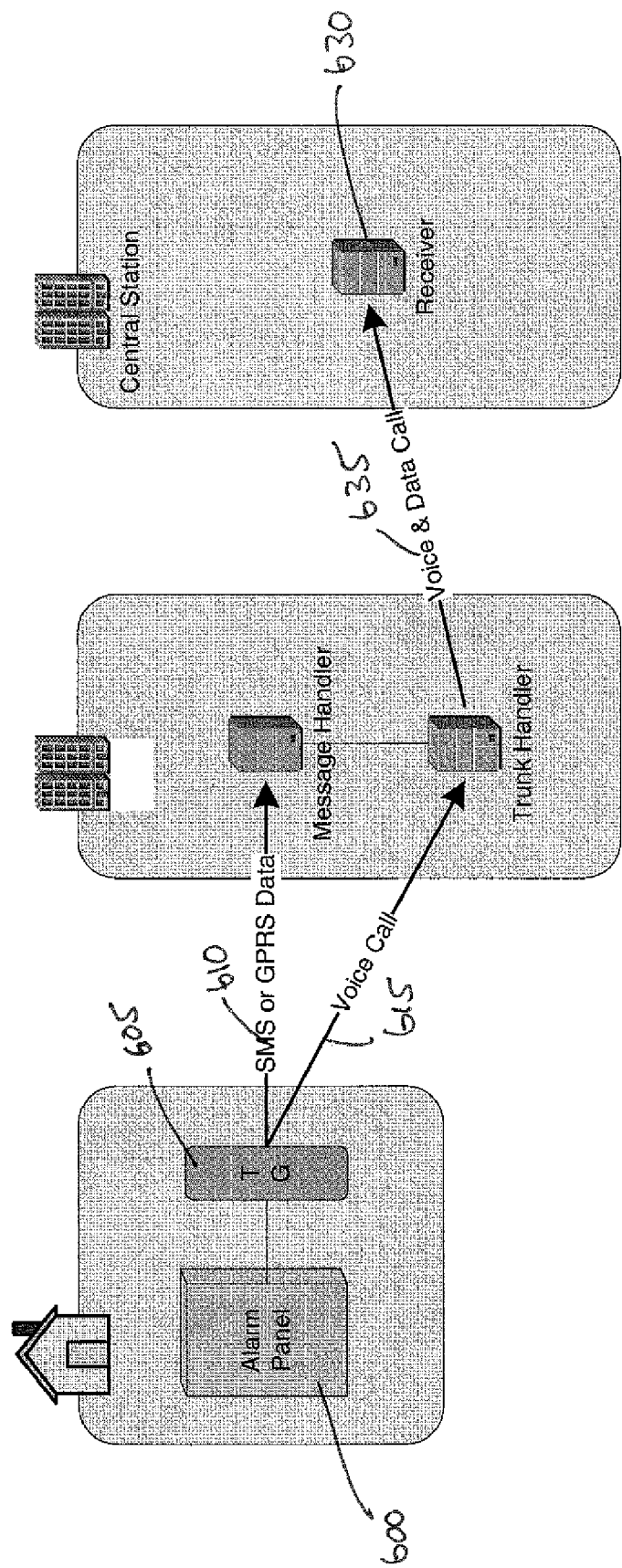
FIG. 6 is an architecture schematic of a system in accordance with one embodiment.

Referring now to FIG. 6, although alarm signals are usually transmitted using modem or DTMF tones, the use of supplementary voice communication is becoming more prevalent, particularly because of the increasing demand for alarm verification (to reduce false alarms in the case of burglary signals), as well as the appearance of Personal Emergency Response Systems, or PERS, which use alarm transmission protocols to communicate personal emergency signals while establishing full-duplex voice. Transporting listen-in signals over GSM presents a unique set of challenges. Making a direct call from the communicator to the central station receiver allows the voice connection to be made, but the transmission of alarm signal tones is unreliable at best. Using GPRS or SMS allows reliable signal transport (after digital translation) but does not provide a voice path. As shown in FIG. 6, one architecture design for the improved system is to connect the alarm panel 600 to a device 605 that transmits the alarm signals 610 while establishing a mobile-originated voice call 615 to a Alarm Communication Center 620. When the Alarm Communication Center calls the alarm receiver 630 to deliver the alarm signals, the outbound call to the central station and the inbound call from the device 605 are joined, establishing a full voice path 635 between the alarm panel and the central station receiver. Delivering the voice call separate from the data, then merging them at the Alarm Communication Center before delivering the alarm to the central station, provides the most secure, reliable path for the alarm signal data, while still allowing a voice path to the alarm panel. Combining the merging of voice and data at the Alarm Communication Center with a dial capture interface at the device allows the feature to be used with almost any panel. Furthermore, since the delivery of CLID across cellular roaming networks is sometimes unreliable, the device may include a pseudo-random sequence of digits in the sent data, and also includes these same digits as DTMF when the call to the Alarm Communication Center is answered. In this way, the data and voice segments can be matched at the Alarm Communication Center even if the CLID is not present or is incorrect.

Referring now to FIGS. 7 and 8, there is shown prior art traditional alarm reporting systems without voice, FIG. 7, and with voice, FIG. 8. In these two systems a telephone connection 700 is made from the alarm panel 705 to the alarm receiver 710. The alarm receiver upon receiving the telephone connection can isolate the alarm event and when needed provide a telephone connection from the alarm receiver to the security professional 715. The security professional can access the data from the server 720.

As shown in FIGS. 9 and 10, the systems according to one or more embodiments of the present invention provides for both without voice, FIG. 9, and with voice, FIG. 10. In FIG. 9, without voice, the alarm panel 3 sends the event and an indication of a listen-in support to the communicator. In FIG. 9 (without voice) the communicator 5 makes a wireless connection to the alarm communication center 25. The dialing subsystem receives the information and proceeds to make a call to the alarm receiver 8 for normal processing. In FIG. 10, the communicator 5 make both a wireless call to the dialing subsystem and a wireless data transfer to the processing subsystem 8. The dialing subsystem joins the two and makes a call to the alarm receiver 12.

As provided for in various embodiments of the invention, there is provided a method, system, and apparatus for establishing an audio communication pathway between an alarm reporting apparatus and a central monitoring station 30. As noted herein, the alarm reporting apparatus may be further defined as being an alarm communicator 5 interfaced either wirelessly or wired to an alarm panel 3 for the purpose of reporting event data notifications initiated by the alarm panel. In this instance, the audio communication pathway is further defined as a 2-way voice communication pathway and/or a 1-way listen-in communication pathway.

In a first method for establishing the audio communication pathway the method would first receive an event data notification from the alarm reporting apparatus. The event data notification would contain information on an alarm event and information on whether the alarm event is an audio-enabled alarm event. Next, the method would receive a voice interface 7 from the alarm reporting apparatus. The method would then combine the event data notification and the voice interface into a single communication link capable of delivering data and audio. With the combined link, the method would connect 11 the single communication link to the central monitoring station 30 such that the single communication link delivers data and establishes an audio communication pathway back to the alarm reporting apparatus.

In a first system for establishing the audio communication pathway the system would include a first processing module and a second processing module. The first processing module is configured to establish a data interface to the alarm reporting apparatus in order to receive an event data notification from the alarm reporting apparatus. The second processing module is configured to receive a voice communication link from the alarm reporting apparatus and configured to receive the event data notification from the first processing module. Once received, the second processing module combines the event data notification and the voice interface into a single communication link capable of delivering data and audio. After combined, the second processing module is configured to connect the single communication link to the central monitoring station such that the single communication link delivers data and establishes an audio communication pathway back to the alarm reporting apparatus.

In a first apparatus, an alarm communication center is provided for establishing the audio communication pathway. The alarm communication center includes an alarm communication processing subsystem and a dialing subsystem. The alarm communication processing subsystem is configured to establish a data interface to the alarm reporting apparatus to receive an event data notification from the alarm reporting apparatus. The dialing subsystem module is configured to receive a voice communication link from the alarm reporting apparatus and configured to receive the event data notification from the alarm communication processing subsystem. The dialing subsystem module is further configured to combine the event data notification and the voice interface into a single communication link capable of delivering data and audio. Once combined, the dialing subsystem module is configured to connect the single communication link to the central monitoring station such that the single communication link delivers data and establishes an audio communication pathway back to the alarm reporting apparatus.

Aspects of the method, system, and apparatus include the ability to disconnect the single communication link to the alarm reporting apparatus upon receiving a disconnect signal from the central monitoring station. In each of these embodiments, the voice communication link from the alarm reporting apparatus and the data interface from the alarm reporting apparatus may be either a wired or wireless link/interface.

From the foregoing and as mentioned above, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

We claim:

1. An alarm communication center for establishing an audio communication pathway between an alarm reporting apparatus and a central monitoring station, the alarm communication center comprising:

an alarm communication processing subsystem being configured to establish a data interface to the alarm reporting apparatus to receive an event data notification from the alarm reporting apparatus, the event data notification containing information on an alarm event and information on an audio-enabled alarm event;

a dialing subsystem module being configured to receive a voice communication link from the alarm reporting apparatus and the dialing subsystem module being configured to receive the event data notification from the alarm communication processing subsystem, wherein the dialing subsystem module being further configured to combine the event data notification and the voice interface into a single communication link capable of delivering data and audio; and the dialing subsystem module being further configured to connect the single communication link to the central monitoring station whereby the single communication link delivers data and establishes an audio communication pathway back to the alarm reporting apparatus.

2. The system of claim 1, wherein the alarm reporting apparatus is further defined as an alarm communicator interfaced with an alarm panel for the reporting of event data notifications initiated by the alarm panel.

3. The system of claim 1, wherein the audio communication pathway is further defined as a 2-way voice communication pathway and/or a 1-way listen-in communication pathway.

4. The system of claim 1, wherein the dialing subsystem module being further configured to disconnect the single communication link to the alarm reporting apparatus upon receiving a disconnect signal from the central monitoring station.

* * * * *